UNITED STATES PATENT OFFICE.

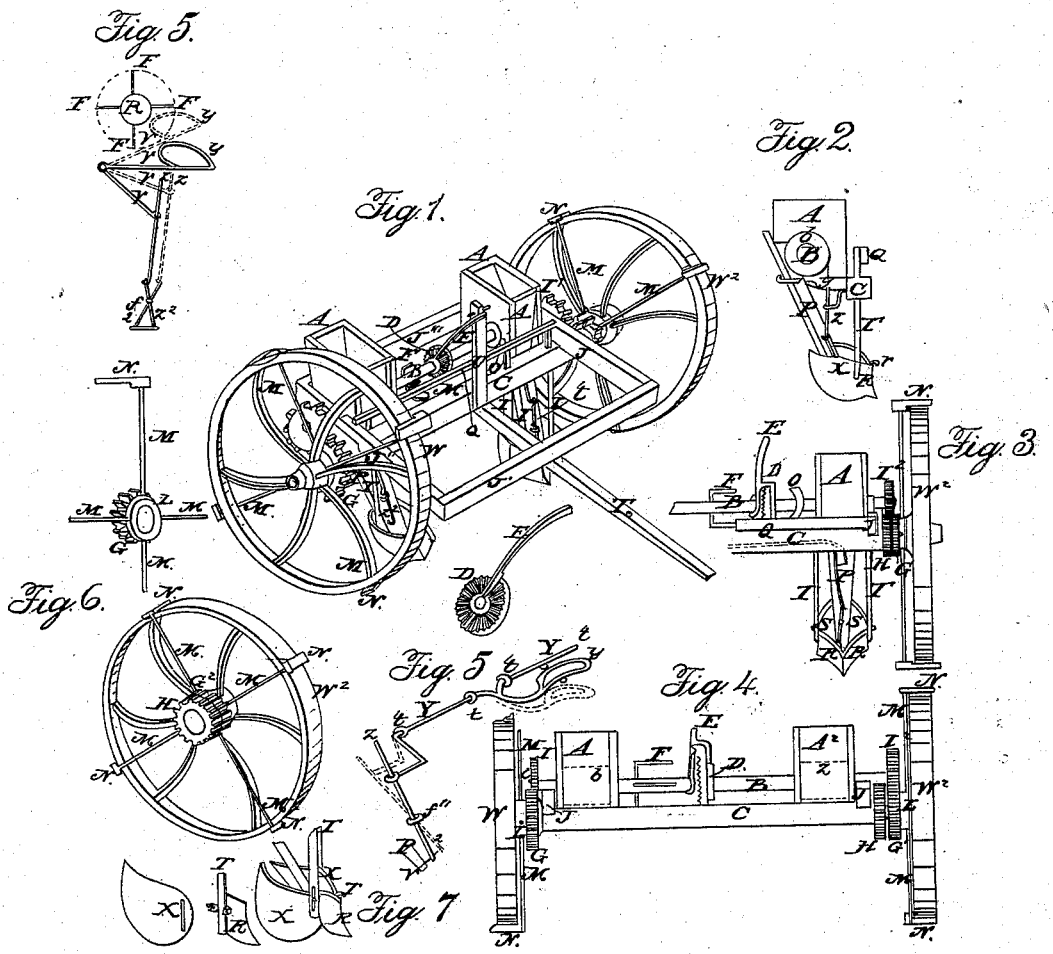

JOHN L. HEISEY, OF ELIZABETHTOWN, PENNSYLVANIA.

IMPROVEMENT IN CORN AND SEED PLANTERS.

Specification forming part of Letters Patent No. 54,901, dated May 22, 1866.

*To all whom it may concern:*

Be it known that I, JOHN L. HEISEY, of Elizabethtown, in the county of Lancaster and State of Pennsylvania, have invented new and useful Improvements in Corn or Seed Planters; and I do hereby declare that the following is a full, clear, and exact description of the construction and operation of the same, reference being had to the accompanying drawings, making a part of this specification, in which—

Figure 1 is a perspective view of a machine with my improvements in place; Fig. 2, a side view of one of the hoppers, &c.; Fig. 3, a front view of the same with other portions of the machinery, Fig. 4 showing the gearing in part shifted. Figs. 5 and 5 *bis* illustrate the compound leverage for operating the lower spout-valve; Fig. 6, inside view of the wheel W², with the permanently-fixed cog-wheel H on the hub, and the loose cog-wheel G′, with the radiating marker-rods M and markers N. Fig. 7 shows my combined shovels R X, there being also parts shown detached.

It is often desirable to plant corn or other seed at regular intervals every way apart, checker fashion. To this end various markers have been devised; but it is found that in turning or otherwise these markers seldom make a mark exactly to coincide with the marks in the track previously made. Besides, when the corn or seed is dropped at once from the hopper through the spout the height or distance renders it uncertain in a great measure in effecting its delivery to the furrow directly opposite the marker.

In order to secure the lodgment of the seed to coincide with the markers I operate both the opening of the valve, near the ground, and markers by means of the dropping-shaft, as also the adjustment of the markers and seed-rollers.

I will now describe the construction and operation, to enable others to make and use the same.

Fig. 6 shows the one wheel W², with the fixed cog-wheel H and the loose cog-wheel G² behind it. This latter has a rim or flange, L, next the wheel, on which rim the radiating marker-rods M are fixed at a regular distance apart, whether two, four, or more are used. To the end of these rods the markers N are fixed close to and overlapping the circumference of the wheel, as shown. There is a like cog-wheel, G, loose on the hub of the other wheel W, (these cog-wheels are all of a uniform size,) having the radiating rods M and markers N in a direct line with each other on both wheels.

The dropping-shaft B, like on ordinary planters, with two hoppers, A′ A², and seed-rollers *b*, has a cogged wheel, I, affixed on each end, which can be shifted from the meshes of the fixed wheel H onto the loose wheels G in going to or from the field; but in order to operate the markers to change their position, in addition to the ordinary shifting, I use a pulley, D, having on its vertical face triangular notches or teeth, to which the side of the lever is adapted by a triangular edge. This lever E not only answers for shifting, but when shifted and pressed into the teeth on the face of the pulley D the dropper-shaft B can be turned, and meshing into the loose cog-wheels G on both sides which support the markers. These are also shifted at pleasure to their desired position on the circumference of the wheels, which remain stationary or not, while the adjustment is made to coincide with the marker in the previous track, in order to cause the seed to drop at the time when each marker is brought exactly under the center of its respective wheel, successively, in driving forward. The openings of the drop-rollers *b* in the hoppers leading to the spouts, as well as the adjustment of the markers, does not affect or change the relative connection of the dropping. On the drop-shaft B, I also affix a series of loops or depressors, E, to coincide in number and position with the markers. These loops or depressors come successively in contact with the lever cam-head *y*, Fig. 5, projecting from the rear of the axle C, and extend upon it by branches Y to behind each hopper A, where it is bent forward, terminated by a loop, directly under each hopper, for the reception of a rod, Z, operating the valve-lever Z², attached to a valve in the bottom of the spout, within a few inches of the ground, directly behind the point of the scoring-shovel R. These spouts P are held by a hook, *r*, on the top angle of the shovel R below, and slide upward in a loop behind the hoppers when raised with the shovel from the ground.

By means of the valves placed in the bottom of the spout the corn or seed is arrested and only dropped on the opening of the valve, and secures its proper lodgment at the exact point in unison with the marks made. These valves may be operated various ways; but I am not aware of any having ever been used before in the bottom of the spout.

It is understood that there is half the distance between the wheels and shovels (or furrows made by them) as that between the two furrows, so that the wheel-track, with the markers impressed in them, going one direction will be a guide for the other wheel and markers when coming back. Hence the dropping and adjusted markers will secure a regular checker throughout the entire field, which no machine has heretofore been able to accomplish with the ease and certainty of this machine, if at all. There is an objection also to the ordinary scoring shovels and scrapers, on account of the liability of hard clods of earth rolling in behind upon the seed in the furrow, which has a tendency to cramp its growth and otherwise interfere in the proper culture; besides, it is found that by covering the seed with well-pulverized soil to a greater depth than is done by the usual means, and after the seed has germinated scraping off the baked top, the seed develops with greater facility and improves in structure. To accomplish both objects I employ, in connection with the ordinary shovel R, a mold-board-like side plate, X, curved inward and upward behind, rounded and slightly bent inward below, with a slot for being adjusted by means of a screw-bolt in the supporting side straps or bars, T, on the front edge of which the shovels R are attached. These supporting-bars T extend through slots in the axle C to a cross-piece, Q, across the machine in front of the hoppers, resting on the axle when the shovels are down, as shown partly on Fig. 3.

The raising of the shovels is effected by a semicircular lever, O, with one end affixed on a pivot to the inside of the cross-piece Q, the convex edge resting on the top of the axle C, so that by depressing the loose end the cross-piece Q is raised up, as shown in Fig. 2, carrying the shovels with it, so as to raise them from the ground.

By setting the side shares or mold-board plates, X, deeper a greater amount of the pulverized soil will be drawn in and the seed covered deeper, adjustable at pleasure. In subsequent top-dressing these shares or plates X may be removed if the same machine is to be used.

These several improvements are deemed important, and for planting checker fashion a desirable implement for the agriculturalist of taste for accurate planting as well as for the utility in giving the plants their uniformly-allotted place.

I am aware that wheels, hoppers, dropping-shaft, &c., are common apart from my improvements herein specified, nor do I claim such parts as my invention.

What I claim as my invention, and desire to secure by Letters Patent, is—

1. The radiating rods M, with their markers N, across the periphery of the wheels, supported on and made adjustable by the loose cog-wheels $G'$ $G^2$, in combination with the gear I, shifting and turning lever E, and side-toothed pulley D, all on the seeding or roller shaft B, arranged and operating substantially in the manner and for the purpose specified.

2. The combination of the seed-valves, when placed in the bottom of the spouts P and operated in unison with the markers N, simultaneously actuated by the seeding or roller shaft B, with its gearing I and depressing-loops F, arranged substantially in the manner and for the purpose set forth.

3. The adjustable mold-board-like side plates, X, adjustable on the supporting-bars T of the shovels R, constructed and operated in the manner specified.

JOHN L. HEISEY.

Witnesses:
B. H. LEHMAN,
JOSEPH S. HEISEY.